US006718714B1

(12) United States Patent
Montgomery, Sr.

(10) Patent No.: US 6,718,714 B1
(45) Date of Patent: Apr. 13, 2004

(54) SAFETY FLOORING ASSEMBLY

(76) Inventor: Phil Montgomery, Sr., 17420 Mt. Herrmann St., #C, Fountain Valley, CA (US) 92708

( * ) Notice: Subject to any disclaimer, the term of this patent is extended or adjusted under 35 U.S.C. 154(b) by 5 days.

(21) Appl. No.: 10/108,928

(22) Filed: Mar. 26, 2002

(51) Int. Cl.⁷ ................................................ E04F 13/08
(52) U.S. Cl. .................... 52/392; 52/391; 52/747.11; 52/315; 52/177; 404/15
(58) Field of Search ......................... 52/177, 180, 181, 52/480, 423.1, 392, 483.1, 315, 747.1, 747.11, 390, 391; 404/9, 15, 19, 28, 29, 32, 33, 35, 36, 42–44; 116/205, DIG. 17

(56) References Cited

U.S. PATENT DOCUMENTS

| | | | | | |
|---|---|---|---|---|---|
| 4,715,743 | A | * | 12/1987 | Schmanski | 404/9 |
| 4,883,394 | A | * | 11/1989 | Van der Woude et al. | 411/51 |
| 5,096,188 | A | * | 3/1992 | Shen | 482/51 |
| 5,234,738 | A | * | 8/1993 | Wolf | 428/120 |
| 5,323,575 | A | * | 6/1994 | Yeh | 52/177 |
| 5,328,293 | A | * | 7/1994 | Keefe | 404/9 |
| 5,619,832 | A | * | 4/1997 | Myrvold | 52/403.1 |
| 5,775,835 | A | | 7/1998 | Szekely | |
| 5,950,378 | A | * | 9/1999 | Council et al. | 52/177 |
| 5,958,538 | A | * | 9/1999 | Kessler | 428/45 |
| 6,296,919 | B1 | * | 10/2001 | Rockwell et al. | 428/85 |
| 6,537,642 | B1 | * | 3/2003 | Jacquet | 428/99 |

* cited by examiner

Primary Examiner—Carl D. Friedman
Assistant Examiner—Chi Q. Nguyen
(74) Attorney, Agent, or Firm—Drummond & Duckworth

(57) ABSTRACT

The present invention relates to a removable and replaceable flooring matrix capable of providing various environmental cues for the safety of disabled persons. The flooring matrix may be installed and de-installed in sections, called sectionals, that are securely attached to the ground or an anchor box by two-part fasteners. In operation, one part of the two-part fastener, or ground anchor, engages an anchor box or the ground, while the other part of the two-part fastener, or matrix anchor, engages the flooring matrix sectional. Sectionals are interchangeable in part due to beveled edges, which create discernible pathways at the perimeter of each sectional for providing a pathway for the wheels of wheelchairs and the like. Flooring matrix sectionals may display a variety of detectable warnings or other environmental cues to alert disabled persons of conditions or hazards, or assist in their transgress.

9 Claims, 10 Drawing Sheets

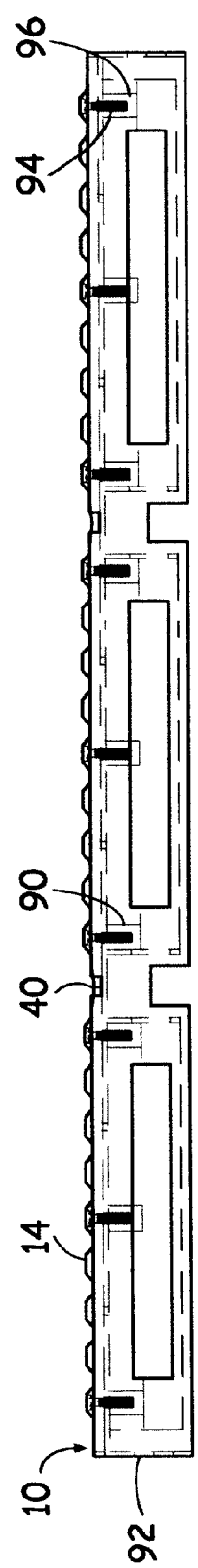
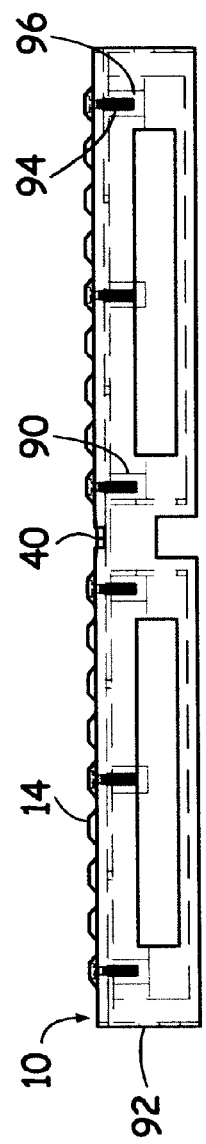

SAFETY FLOORING ASSEMBLY

BACKGROUND OF THE INVENTION

This invention generally relates to floor coverings for notifying pedestrians, persons in wheelchairs, and bystanders of a nearby drop-off or dangerous ledge. This invention also generally relates to floor coverings specially adapted with grooves, protuberances, or textures for notifying and instructing pedestrians, persons in wheelchairs, and bystanders of appropriate safety measures. The special adaptations, or "detectable warnings" provide a more safe environment for those in the vicinity of patent and latent dangers.

The Federal Government has enacted 28 C.F.R. Part 36 which requires the presence of detectable warnings to notify disabled persons of the presence of nearby drop-offs and ledges. The purpose of which is to enable disabled persons to function more easily in society in general and does so by providing safety standards and adaptable access means for the disabled.

Disabled individuals are a disadvantaged minority who are continually faced with restrictions and limitations, particularly when it comes to transportation and accessing high traffic and mass transit locations. For example, platforms adjacent to mass transit throughways, such as bus stops, train platforms, metro stops, and airplane runways must remain easy to navigate for the mass population, yet safe for the individual who is blind or constrained to a wheelchair.

Detectable warnings provide a solution for the sight impaired who are dependent on environmental cues—sounds, elements that can be detected by a cane, or textures underfoot that can warn the disabled of hazardous conditions. Likewise, persons in wheelchairs can rely on physical borders on the ground's surface to prevent themselves from mistakenly departing from level ground.

The Code of Federal Regulations (C.F.R.) imposes upon the construction and design of certain public facilities to bear disabled persons in mind so that disabled persons can utilize the facilities. While the American Disabilities Act of 1990 (ADA) is generally designed to remove or lessen the number of barriers to which handicapped and disabled individuals are subjected, implementation of the remedial aspects of the ADA has been inhibited or delayed because of the practical difficulties of implementing safety adaptations without compromising facilities.

Often times, detectable warnings are required on walking surfaces that cross or join vehicular ways or other environmental hazards where, for example, there is no curb, wall, railing, or other separation means to alert pedestrians and the like passing into an area of potential danger.

28 C.F.R. Part 36 Section 4.29.2 states in part:

"Detectable warnings shall consist of raised truncated domes with a diameter of nominal 0.9 in (23 mm), a height of nominal 0.2 in (5 mm) and a center to center spacing of nominal 2.35 in (60 mm) and shall contrast visually with adjoining surfaces, either light on dark, or dark on light."

The code further requires that the surface comprise a 36 inch wide border that creates a boundary between pedestrian areas and hazardous areas such as train and vehicular areas. (28 C.F.R. Part 36 Section 4.29.5). Platform edges in transit stations are permitted to have borders of only 24 inches in width along the edge of the platform.

In addition, detectable warnings must extend along the entire surface of the flooring, and the flooring must be comprised of a non-slip matrix, again, having a strong color contrast with the surrounding ambient environment. Frequently, a matrix of the color yellow, conforming to Federal Color No. 33538, is required.

Accordingly, there are manufacturers who manufacture safety flooring surfaces with the specified detectable warnings to comply with 28 CFR Part 36. The disadvantage of such surfaces is that previous manufacturers have provided a safety flooring surface that is applied to the existing ground or ambient floor surface by a permanent adhesive. In addition, and to make replacement even more problematic, the flooring surface is typically installed from large rolls, such as linoleum. The adhesive tends to be so strong that subsequent efforts to remove the safety flooring surface results in destruction of the ground structure. This destruction in turn requires a re-laying of the existing ground structure, such as concrete, etc. As can be imagined, this reconstruction process is costly and disruptive, such as, to a nearby transit system, as well as, to its passengers.

The present invention eliminates the present hardship of having to damage the ground structure every time any portion of the safety flooring surface requires replacement. The present invention also greatly facilitates the installation and de-installation of flooring surfaces by providing interchangeable sections. Sections may be interchanged repeatedly as the mechanism for attaching the flooring surface is secure yet mechanically reversible.

Moreover, the present invention also provides a flooring surface having pathways in the form of discernible grooves or otherwise smooth areas for permitting the passage of wheels of a wheelchair or the like. Alternatively, a flooring surface may include raised bars for actually directing the movement and direction of the wheels of a wheelchair. Accordingly, the present invention provides a flooring surface possibly having: pathways for permitting the wheels of a wheelchair, raised bars for directing the wheels of a wheelchair, and detectable warnings for providing an environmental cue for disabled persons. The combination of the aforementioned surface characteristics may be variously combined and choreographed depending on the particular needs and hazards presented by the surrounding environment.

SUMMARY OF THE INVENTION

Briefly summarized, the present invention permits the installation of flooring matrix in sections and without the need for a permanent adhesive. Instead, the present invention consists of sections of flooring matrix that may be secured and removed by brackets or bolts that engage a walking surface, e.g. either points on the ground or an anchor box embedded within the ground structure. The anchor box, while anchored within the ground structure, need only be installed once and may support replacement after replacement of any number of the sections of the flooring matrix that are operatively secured to the upper surface of the anchor box.

Mechanisms for securely attaching the flooring matrix sectionals to a walking surface can vary but are depicted herein by conventional threaded bolts that originate optionally from either the flooring matrix sectional or the walking surface underneath. The threaded bolts engage a threaded female portion embedded in the flooring matrix sectional or walking surface, with the bolt and female portion collectively forming a two-part fastener. Though the present invention is described herein using conventional threaded two-part fasteners, any appropriate fastener for securely attaching the flooring matrix sectional to the walking surface underneath may be applied.

As defined herein, the two-part fasteners include: 1) a matrix anchor engaging, attached to, or embedded within the matrix sectional, and 2) a ground anchor which is embedded within the ground substrate. The flooring matrix sectionals may be securely fastened to the ground by the matrix anchors attached to either: a suite of independently positioned ground anchors embedded within the ground, or an anchor box that incorporates, within its structure, a suite of ground anchors. Either construction of ground anchors, independently placed or in an anchor box, can easily be installed into the ground during the construction of a facility, say for example, by incorporating the ground anchors into concrete when it is still wet, or after construction is complete, say for example, by threading the ground anchors into dry concrete.

One advantage of the present invention is that it enables easy installment and de-installment of flooring specially adapted for the safety of disabled persons. Areas particularly in need of such flooring includes mass transit depots and the like where repairs may be exceptionally inconvenient and costly.

Additionally, the present invention facilitates the mass production of identical, and therefore, interchangeable flooring matrix sectionals. Of particular note is that each sectional can be characterized by beveled edges which provide a uniform shape among sectionals. Accordingly, no matter where a repair may be necessary within a mass spread of flooring, any sectional will be an appropriate replacement due to the uniform size and beveled edges.

The beveled edges of each sectional may be intended to provide pathways for the wheels of wheelchairs or other devices to assist disabled persons. Additionally, the width and length of the sectionals may be appropriately modified so that the beveled edges of two abutting sections coincide with the standard wheel base of certain wheelchairs, for example. Of course, other modifications to the surface and traits of a flooring matrix sectional may be implemented for providing any number of variable particular functions for disabled persons. The most common functions are for providing detectable warnings or directional cues to disabled persons. For instance, the present invention discloses the use of surface features to indicate to disabled persons the location of entrances and exits of train compartments, for example. More innovative features of the present invention include optional heating elements for preventing snow and ice build-up that could otherwise cover and obscure the important environmental cues relied upon by disabled persons. Other superficial characteristics, such as, the form of patterns or colors, may be applied to the flooring matrix sectionals as well.

BRIEF DESCRIPTION OF THE DRAWINGS

FIG. 13 is a side view of an anchor box having a width capable of seating three adjacent flooring matrix sectionals;

FIG. 14 is a side view of an anchor box having a width capable of seating two adjacent flooring matrix sectionals;

DETAILED DESCRIPTION OF THE INVENTION

Looking now in greater detail at the accompanying drawings, the present invention is comprised of a flooring matrix that is attached to a ground substrate by engageable and disengageable two-part fasteners. The flooring matrix is planar in shape, though the geometric dimensions of the flooring matrix may be any possible variation of a sectional piece to facilitate prefabrication and replacement. By way of example, the present invention encompasses various sized square, rectangular, and polygonal sectionals of flooring matrix which are assembled to form a walking surface.

Figure 2:
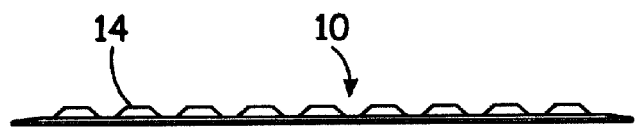
FIG. 2 is a side view of one flooring matrix sectional.
Figure 3:
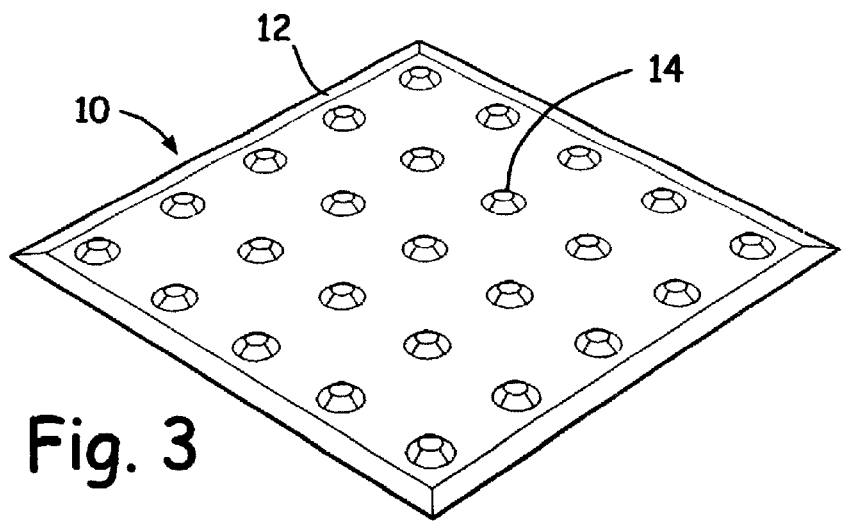
FIG. 3 is a side view of one flooring matrix sectional.

With reference to the figures, the preferred flooring matrix sectional (also referred to herein as a "sectional") 10 is square and has a side length of approximately 12 inches. The edges 12 of the sectional are preferably beveled with the beveled edge 12 occupying approximately one half inch of the perimeter of each sectional 10. In addition to beveled edges 12, the flooring matrix sectional 10, preferably includes superficial detectable warnings 14 within the boundaries of each section's beveled edges 12. The detectable warnings 14 provide environmental cues for warning the sight impaired and others of a nearby hazardous condition, e.g. a drop off. With reference to FIG. 2, the contour created by the detectable warnings 14 may comply with United States Federal Regulations' standards for detectable warnings 14, though various standards and patterns may be applied. By way of example, the American Disabilities Act of 1990 prescribes evenly spaced truncated domes wherein each dome is separated from another by 2.35 inches, has a 0.9 inch diameter at its base, and reaches a height of 0.2 inches. FIG. 3 illustrates typical truncated domes for use as detectable warnings 14 in compliance with U.S. regulations.

It should be clear, however, that the present invention bears in mind other possible governmental and non-governmental standards and other reasonable adaptations for providing an environmental cue to disabled persons.

Figure 4:
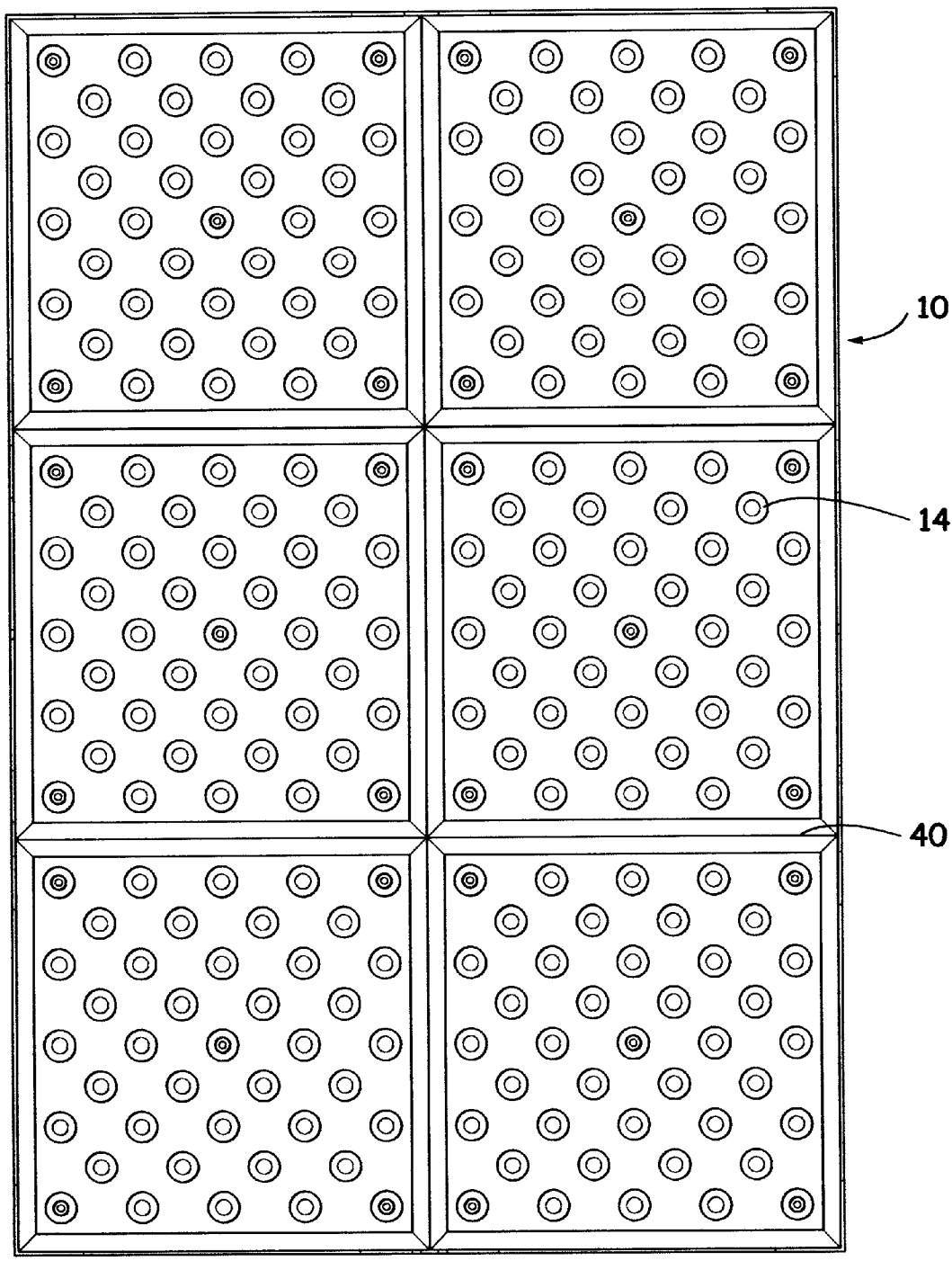
FIG. 4 is a top view of several flooring matrix sectionals used in coordination with one another.
Figure 5:
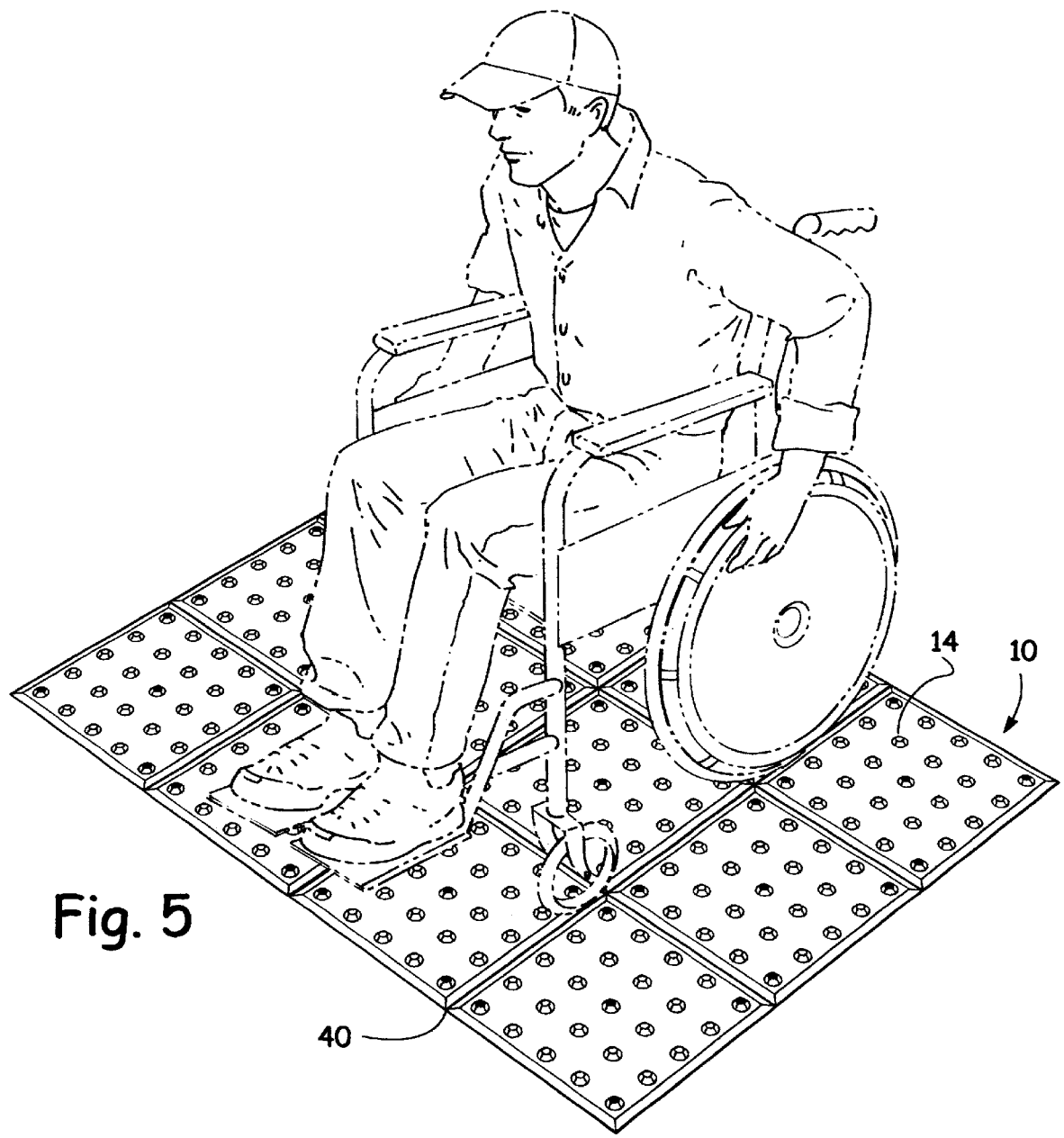
FIG. 5 is a perspective view of several flooring matrix sectionals used in coordination with one another and being utilized by a person in a wheelchair.

With reference to FIG. 4, a plurality of flooring matrix sectionals 10 are assembled in coordination with one another to form a walking surface. Preferably, a discernible pathway 40 is created where two sectionals 10 abut one another. Consequently, in a preferred embodiment, when two beveled edges 12 of two abutting flooring matrix sectionals 10 are aligned and positioned on the ground, a discernible pathway 40 in the flooring matrix is created in increments of approximately every 12 inches. The discernible pathway 40 is intended to provide a trough or groove to catch and direct the wheels of a wheelchair or the like. The discernible pathways provide a smooth surface by which a handicapped person, either assisted by a wheelchair or stroller of some kind, may traverse the surface of the flooring matrix with ease and without obstruction. FIG. 5 is particularly demonstrative of how persons in wheelchairs may benefit by the discernible pathways 40 for providing a smooth pathway for the wheels of a wheelchair.

Figure 6:
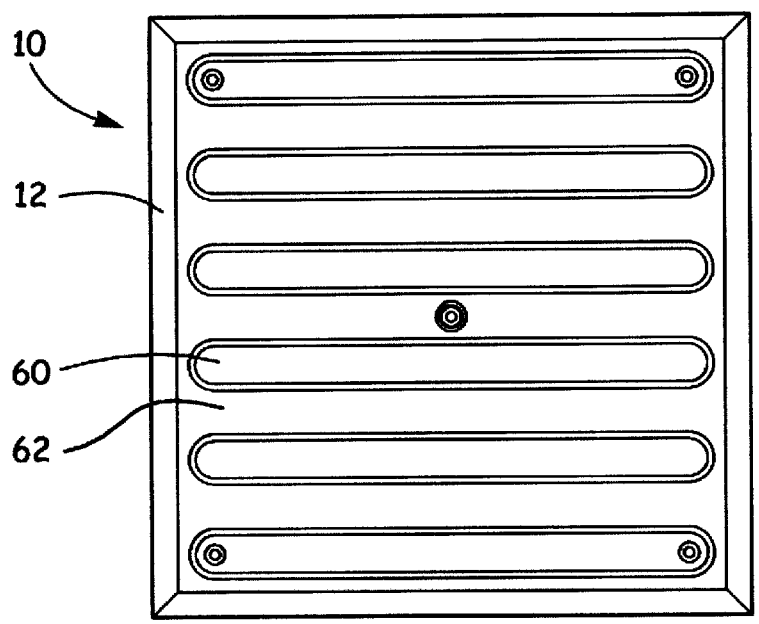
FIG. 6 is a top view of several flooring matrix sectionals specially adapted for wheelchairs only.

Alternatively, in place of or in combination with detectable warnings 14 described above, the flooring matrix may be characterized by repeated superficial bars 60 for the purpose of catching and directing the wheels of a wheelchair or the like. For example, FIG. 6 shows a series of bars 60 for more clearly adapting a walkway for persons needing assistance from a device having wheels, e.g. wheelchairs, walkers, strollers, carts, etc. As such, the sectionals 10 including bars 60, rather than truncated domes 14, are more appropriately installed for providing an accessible route for wheelchairs and the like.

Figure 7:
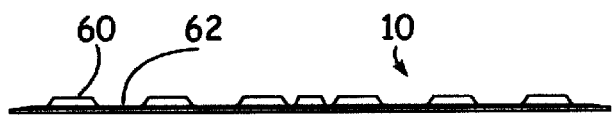
FIG. 7 is a side view of several flooring matrix sectionals specially adapted for wheelchairs only.

The preferred embodiment of a flooring matrix sectional 10, for providing an accessible route for wheelchairs and the like, includes a series of approximately parallel raised bars 60 approximately 1.88 inches apart. The resulting pattern creates repeated troughs 62 also approximately 1.88 inches apart. A contour resulting from bars 60 on the surface of a flooring matrix sectional 10 is illustrated in FIG. 7. Other particular standards for the incremental spacing, widths of each trough 62 and reciprocal bar 60, as well as the height of each trough 62 and bar 60, are possible. Therefore, any reasonable combination of traits characterizing the troughs 62 and bars 60 may be applied and may vary considerably.

Figure 8:
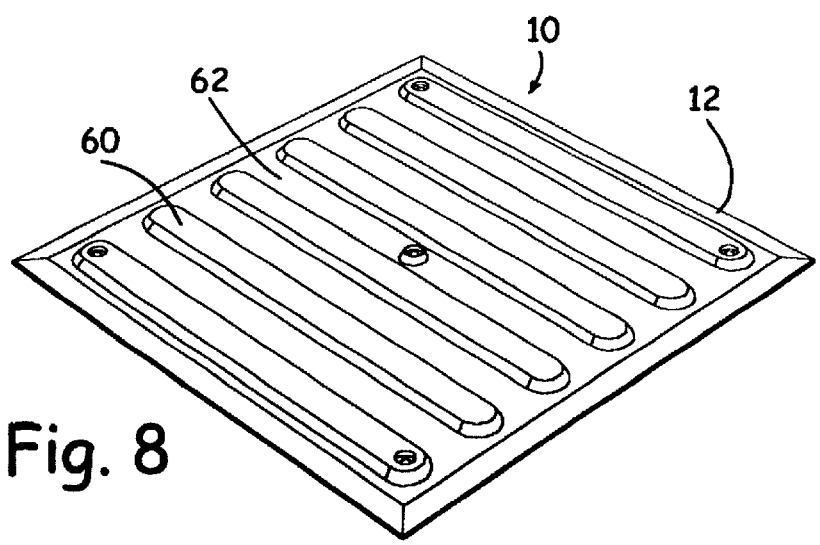
FIG. 8 is a perspective view of several flooring matrix sectionals specially adapted for wheelchairs only.

It should be noted that while a flooring matrix sectional 10 may be characterized by bars 60 for catching and directing the wheels of a wheelchair or similar device, in only two directions, e.g. forwards and back, multidirectional bars 60 are possible and anticipated by the present invention. Multidirectional bars, by comparison, would be created by a grid-like arrangement of bars that intersect but are continuous, if not contiguous, for the expanse of each section. A sectional having bars 60 that are only two directional, for example, is depicted in FIG. 8.

Although not illustrated in the figures, another preferred embodiment of the invention is typified by one or more surface bars designed to indicate where the various exits and entrances of a building or structure are located. For example, one or more raised bars may be integrated into the flooring matrix sectional 10 immediately adjacent to the entrance of a train compartment. Raised bars may indicate the presence of an exit, entrance or similar throughway. In this instance, a raised bar would indicate where the throughway provided passage by its placement adjacent to the throughway. Similarly, raised bars may be used to indicate the exits and entrances of any depot, e.g., to assist disabled persons in departing the transit facility.

Figure 9:
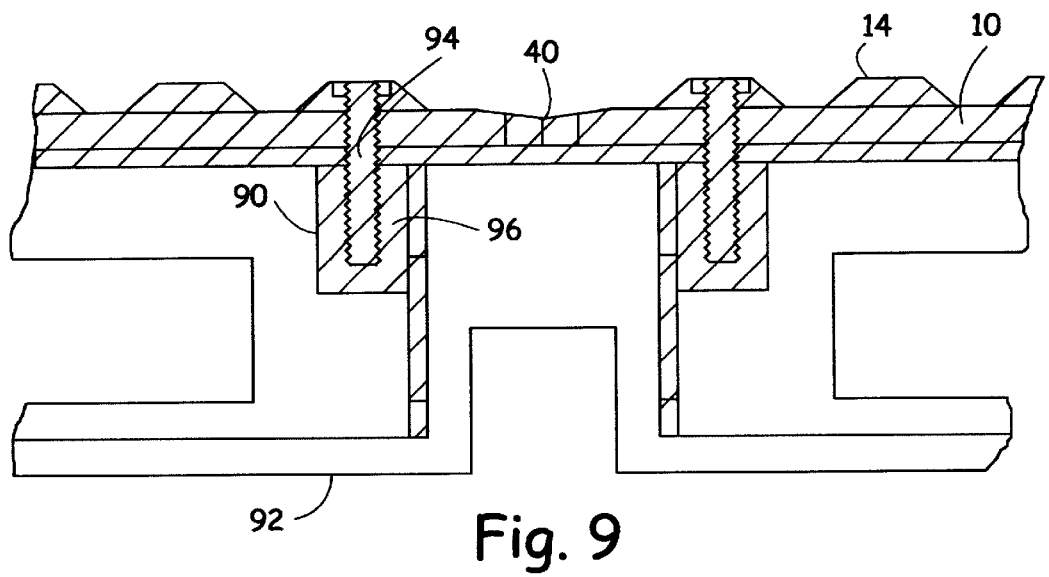
FIG. 9 is a side view of two abutting flooring matrix sectionals securely attached to an anchor box by two apparent screws.
Figure 10:
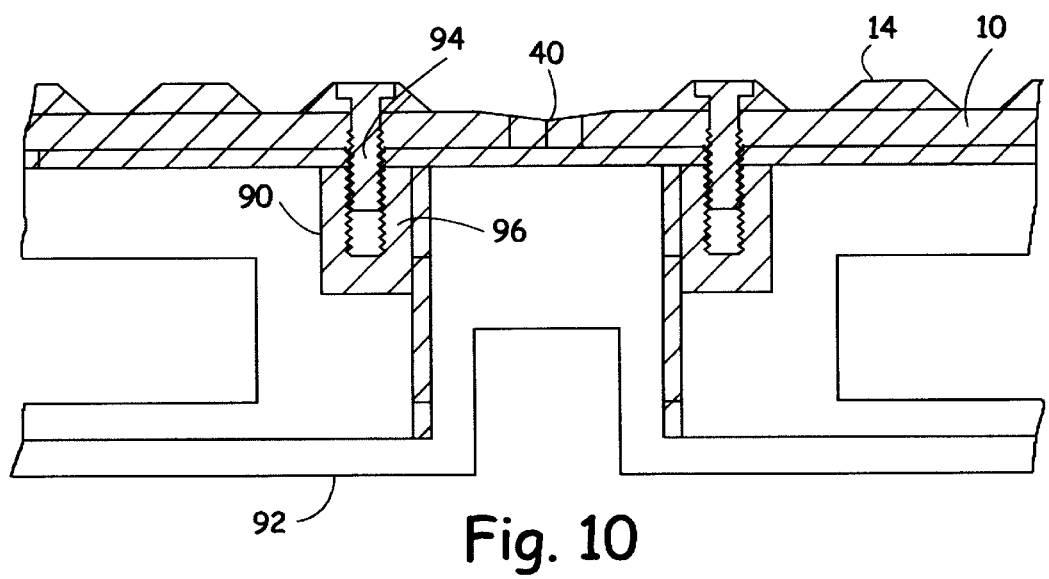
FIG. 10 is a side view of two abutting flooring matrix sectionals securely attached to an anchor box by two conventional bolts.

With reference to FIGS. 9 and 10, the flooring sectionals are attached to the ground by a plurality of engagable and disengageable two-part fasteners. To enable a secure hold from the flooring matrix sectional 10 to the ground, the fasteners 90 comprise two parts, a matrix anchor 94 which engages the flooring matrix sectional 10, and a ground anchor 96 embedded within the ground substrate. The two-part fasteners may be provided in any of numerous constructions as can be selected by those skilled in the art.

For additional clarity, the two-part fasteners 90 are primarily described as the two parts of a conventional threaded fastener. For example, the matrix anchor 94 may be either: the hollow threads of a nut-like fitting embedded into the matrix of the flooring matrix sectional 10, or a threaded bolt affixed to the floor matrix sectional 10 so as to permit the selective engagement to a threaded receptacle, such as a nut. Likewise, the ground anchor 96 of the two-part fastener 90 may also be either part of a conventional threaded fastener so long as the mating part comprises the two-part fastener's 90 matrix anchor 94. In no way is the two-part fastener 90 limited to the embodiment of a threaded fastener as one skilled in the art of construction will be able to utilize numerous fastening devices or locking means for use as a two-part fastener 90 with regards to the present invention. When the two parts of each fastener 90 are engaged with each other, the flooring matrix sectional 10 is considered secured to the ground, etc, and "locked" in place. FIG. 10 is identical to FIG. 9 except that it shows a different type of two-part fastener 90, wherein the matrix anchor 94 is depicted as a conventional screw and the ground anchor 96 is hollow threads for engaging the matrix anchor 94.

Figure 15:
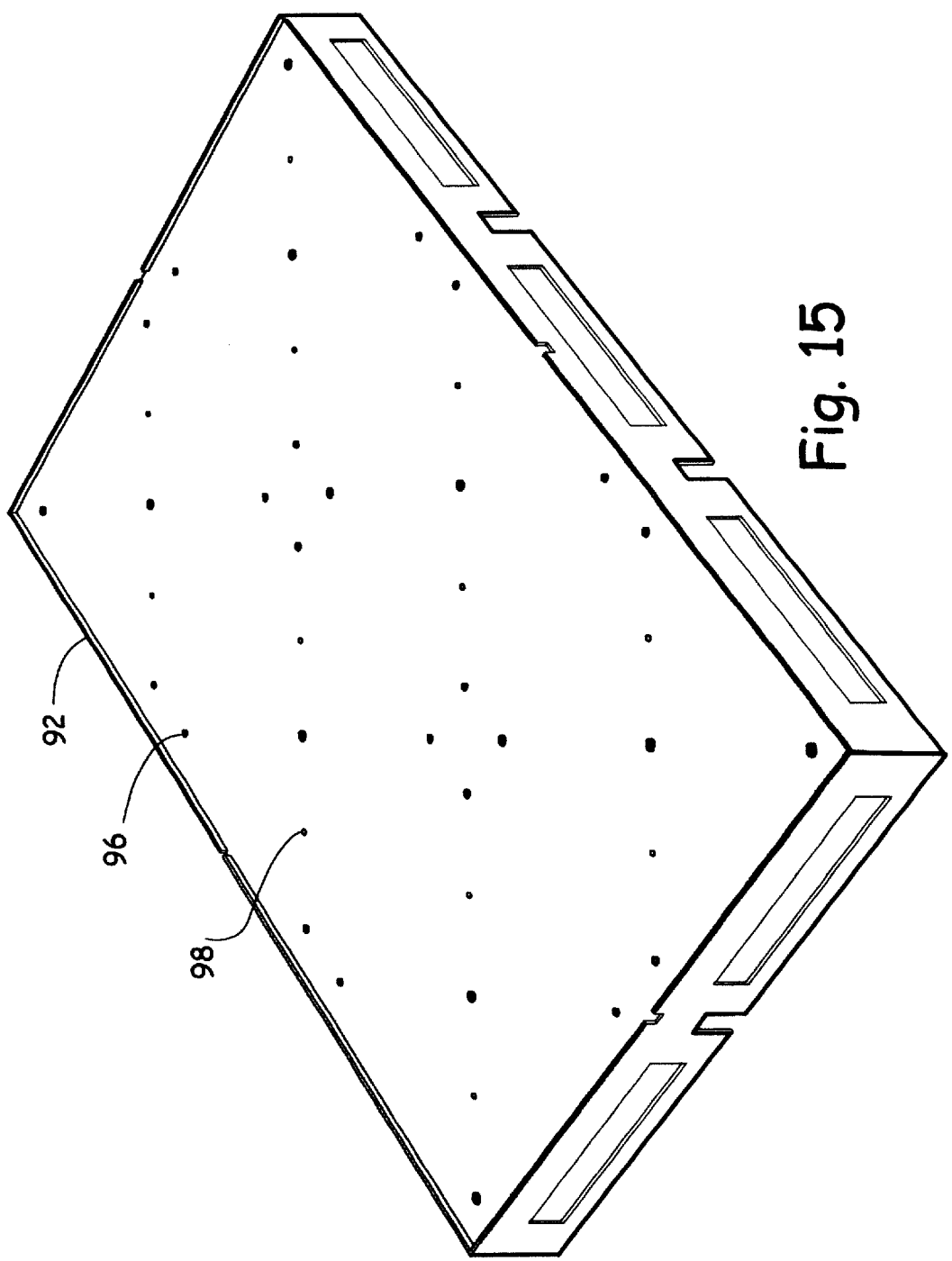
FIG. 15 is a perspective view of an anchor box.

As shown in FIGS. 9 and 10, the ground anchors 96 are preferably integrated into a horizontally extending anchor box 92 which is intended to be embedded within the ground substrate. The anchor box 92 is a frame-like structure constructed of plastic, wood, metal or other material that is embedded in the ground for providing a structural base for positioning and affixing the ground anchors, and for securely attaching the flooring matrix sectionals 10. Preferably, the anchor box 92 is made hollow so as to be light-weight and easy to transport. Also preferably, the anchor box 92 is installed into concrete when it is still "wet". To this end, to facilitate installing an anchor box 92 into wet concrete, the top of the anchor box 92 preferably includes air holes 98 for permitting the escape of ambient air when the anchor box is laid into wet concrete, as depicted in FIG. 15.

Figure 11:
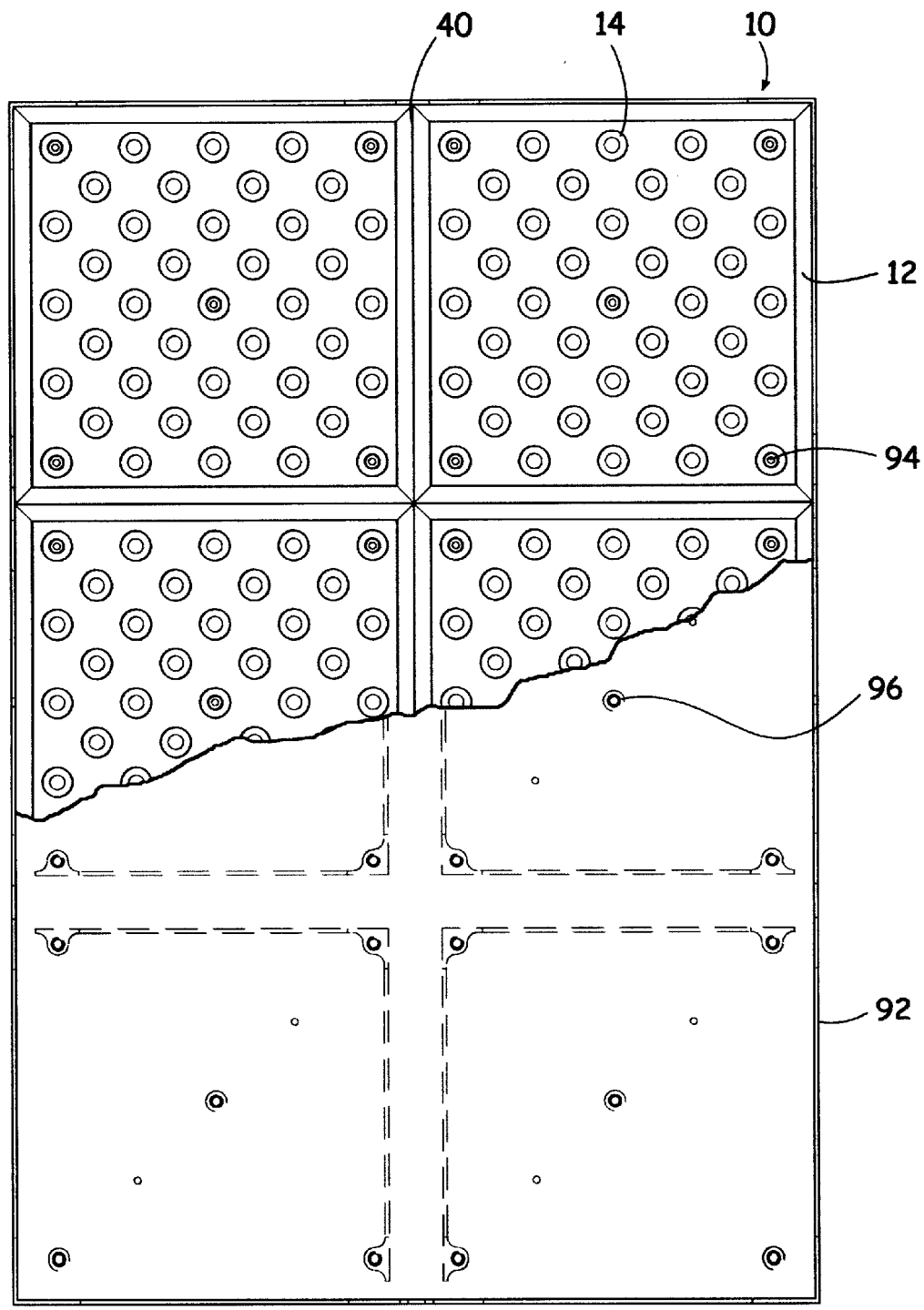
FIG. 11 is a top view of an anchor box underneath and supporting two whole and two torn flooring matrix sectionals that are attached.
Figure 12:
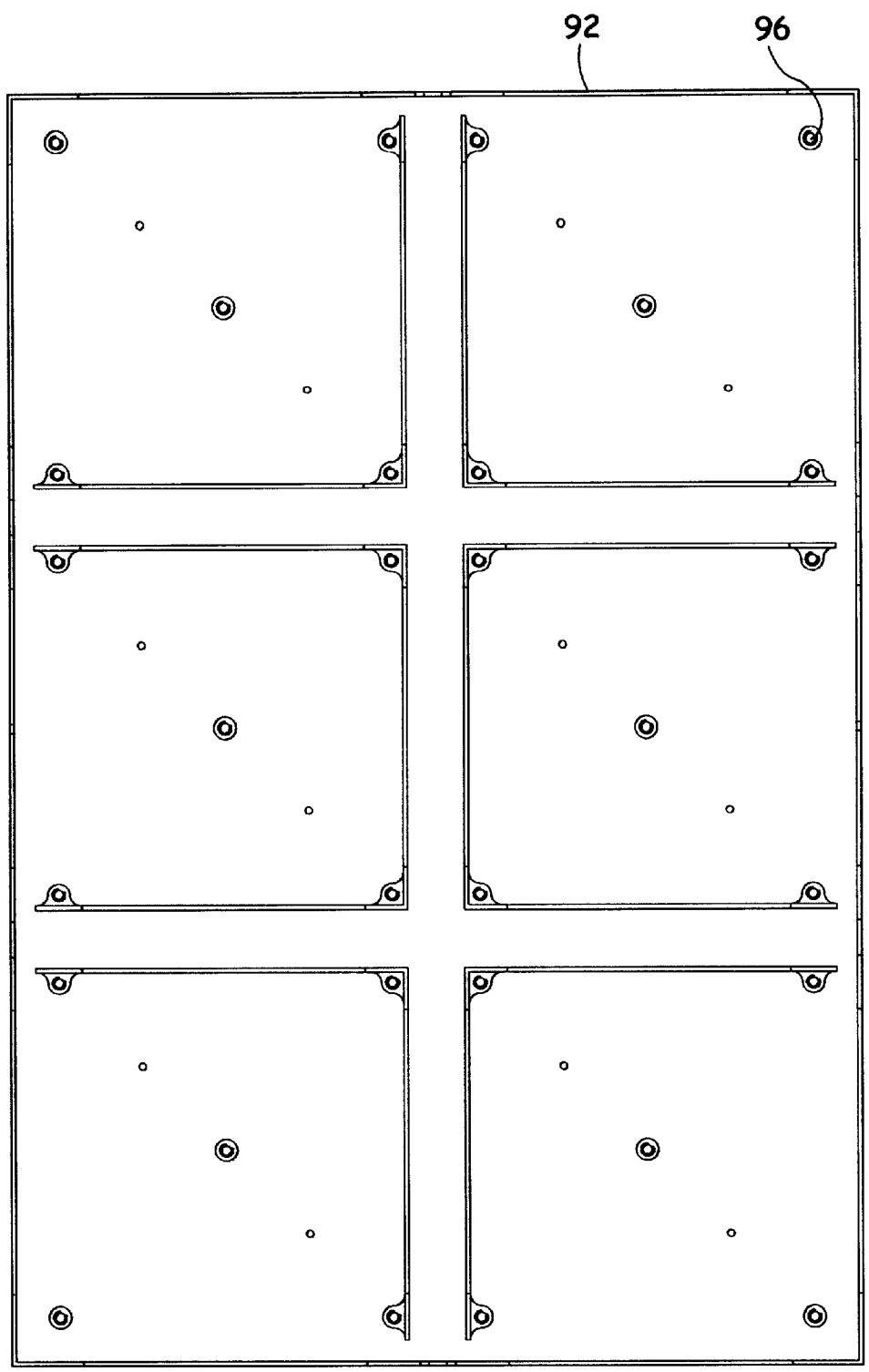
FIG. 12 is a bottom view of an anchor box showing beams for supporting the body of the anchor box.

FIG. 11 is the top view of an anchor box 92 capable of seating six flooring matrix sectionals 10. Each sectional 10 preferably permits five two-part fasteners 90 to affix on or through the flooring matrix for the purpose of securing each sectional 10 to the walking surface underneath, e.g. an anchor box 92, a bridge, walkway, boardwalk, etc. A possible configuration of ground anchors 96 arranged in the shape of an "X" with regards to an anchor box 92 is also illustrated. While the two-part fasteners 90 may be arranged in optional configurations, the "X" configuration provides a near contiguous hold from the flooring matrix sectional 10 to the ground or substrate. Optionally, a semi-permanent glue may be applied between the sectional 10 and the ground or substrate, around the two-part fasteners 90, to provide a more tight relationship between the sectional 10 and ground or substrate.

The anchor box 92, usually containing a suite of ground anchors 96 of two-part fasteners 90, should be embedded into the ground or substrate so that when the flooring matrix sectionals 10 are also engaged, the surrounding ground level is flush with the surface of the flooring matrix. Additionally, when the flooring matrix sectional 10 is securely attached and locked to the ground or anchor box 92, for example, the matrix anchors 94 of the two-part fastener 90 do not significantly alter or interfere with the surface pattern of the matrix. This being so, the transgress of pedestrians who rely on the detectable warnings 14 or bars 60, are not affected by the presence of the two-part fasteners 90. One skilled in the art of construction, for example, has ample knowledge and skill to install any number of anchor boxes 92 or ground anchors 96 of two-part fasteners 90 while ensuring that the entire ensemble (matrix anchor 94 and ground anchor 96 of the two-part fasteners 90, flooring matrix sectionals 10, and optional anchor box 92) remain flush with the surface of the flooring matrix.

In another embodiment, temperature controls can be embedded into the anchor box 92 for maintaining the integrity and functionality of the flooring matrix sectionals 10 above. In cold weather climates, where snow and ice can be anticipated, a heating element may be incorporated into the anchor box 92 to ensure that the surface features of the flooring matrix sectionals 10 are not covered or obscured by weather conditions, such as slush, snow, or ice. Heating elements may vary in design and manufacture, but are typically comprised of electrical elements, similar to the electrical elements found in "heat blankets". Particular considerations regarding placement, heating thresholds, and fire prevention will be known to someone skilled in the art of construction. As envisioned, the heating element may be positioned underneath the flooring matrix sectionals 10, embedded into an anchor box 92, and encapsulated or insulated by a water proof cover to prevent water damage or fire hazard. In operative mode, the heating elements will not interfere, obstruct, or alter the surface features of the flooring matrix sectionals 10.

Figure 1:
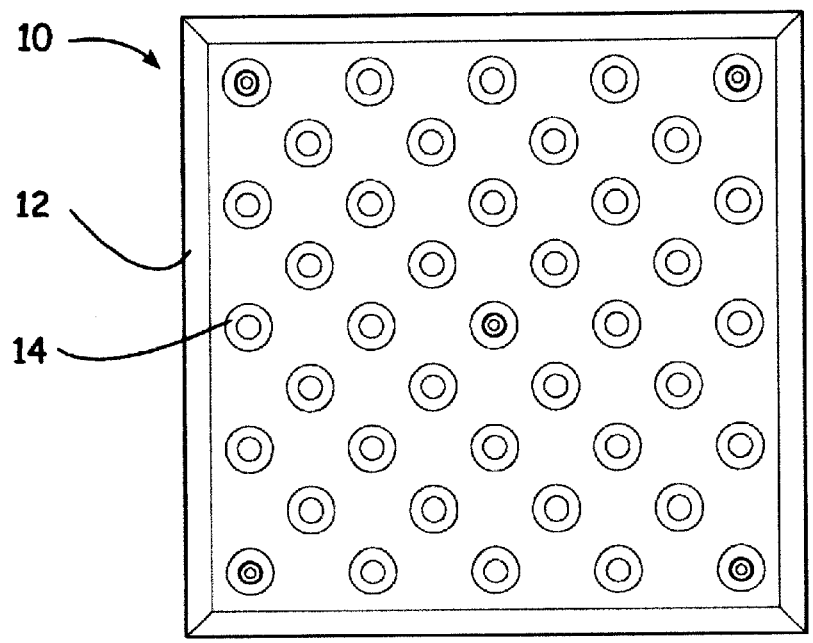
FIG. 1 is a top view of one flooring matrix sectional.

The invention has been primarily described as including an anchor box 92 for positioning and aligning ground anchors 96 within the ground. The use of the anchor box 92 is considered preferable. However, an additional preferred embodiment of the invention includes ground anchors that are independently placed within the ground without the use of an anchor box. To this end, a plurality of anchors are embedded within the ground. For example, five anchors would be embedded within the ground for engaging and locking in place one or more flooring matrix sectionals, as shown in FIGS. 1–3. Whether ground anchors 96 are independently placed or associated with an anchor box 92, the flooring matrix sectionals are capable of securely locking in place, and unlocking for repeated replacements.

The independently placed ground anchors 96 can be installed into wet or dry concrete, or any other substrate, alternatively to, or in conjunction with, an anchor box 92. Although not shown in the figures, flexible or inflexible templates or ground over-lays, which are less substantial than anchor boxes, may be used to aid in the placement, planning, or setting of independently placed ground anchors. Accordingly, a template's pattern may provide an appropriate plan for placing the independently placed ground anchors 96.

Figure 16:
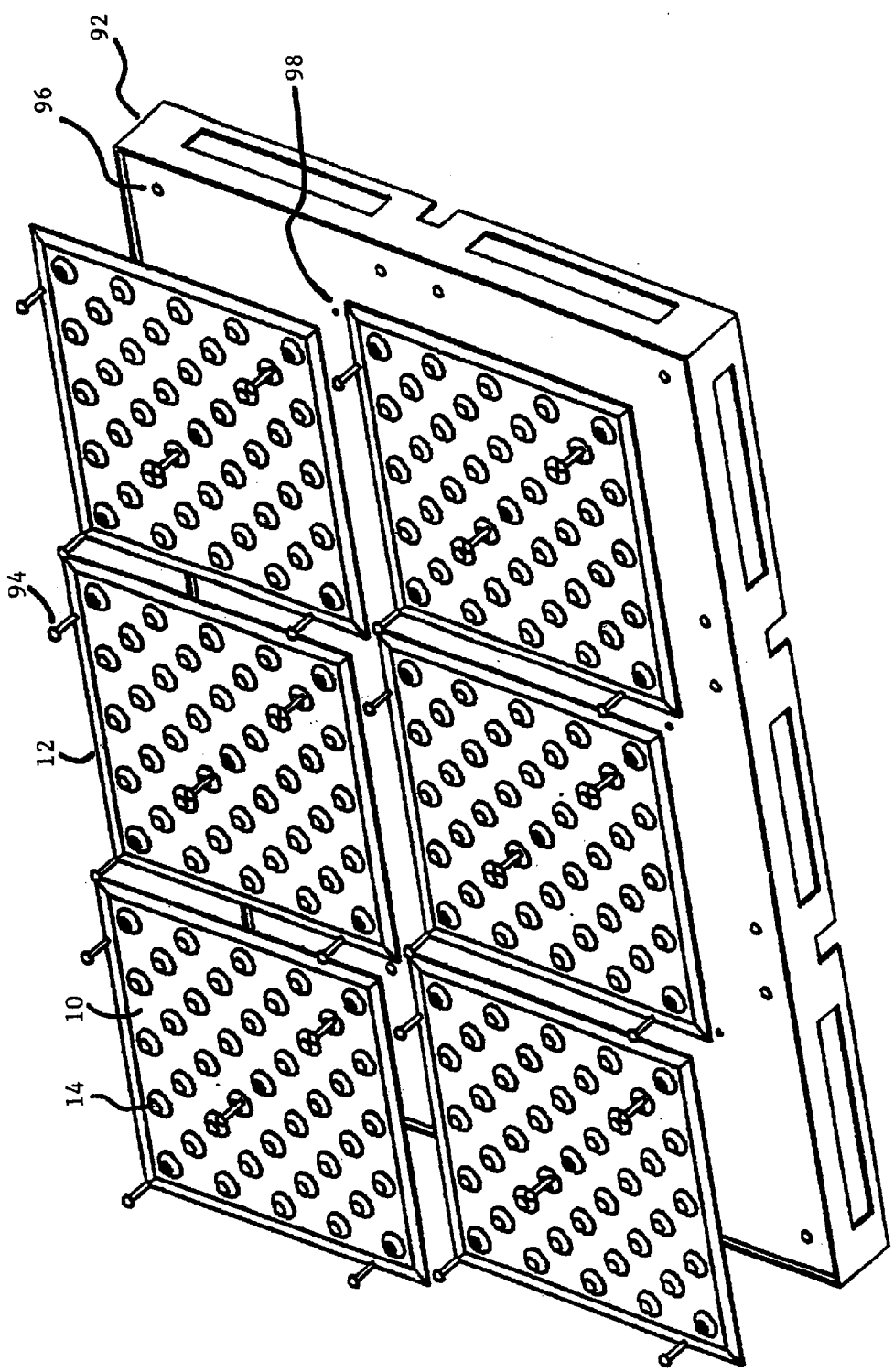
FIG. 16 is an exploded perspective view of the anchor box, matrix anchors, and six flooring matrix sectionals.

The installation and de-installation of flooring matrix sectionals 10 is made easier by the relatively few number of two-part fasteners 90 necessary to secure the flooring matrix sectionals 10 to the ground or anchor box 92, whichever the case shall be. The technical experience necessary for installation and de-installation is fundamental, as can be discerned in FIG. 16. The exploded view demonstrates the ease with which each sectional can be removed and replaced easily without disturbing the surrounding area or the integrity fo the ground beneath.

Due to the innovative adaptations and design of the disclosed invention, facilities that incorporate safety flooring assemblies will save time and money in maintaining their facilities, while ensuring a safe environment for disabled persons, and coincidentally, comply with Federal Rules and Regulations concerning the same.

Having described my invention in such terms as to enable persons skilled in the art to understand the invention, recreate the invention, and practice it, and, having identified the presently preferred embodiments thereof, I claim:

1. A removable safety flooring and anchor box assembly comprising:
   a cement ground substrate;
   an anchor box embedded within said cement ground substrate, said anchor box including a top sized for supporting one or more tiles and including one or more sidewalls for projecting into said cement ground substrate;
   one or more flooring matrix sectionals positioned upon said anchor box forming a walking surface; and
   a plurality of two-part fasteners each of said two-part fasteners consisting of a matrix anchor engaging said flooring matrix sectional and a ground anchor engaging and affixed to said anchor box, said matrix anchors and ground anchors being selectively engageable and disengageable to one another for selectively securing said one or more sectionals to said anchor box and for selectively disengaging said one or more sectionals to said anchor box for permitting the removal and replacement of said sectionals without damage to said cement ground substrate or damage from said anchor box.

2. The removable safety flooring and anchor box assembly of claim 1 wherein said one or more sectionals include beveled edges.

3. The removable safety flooring and anchor box assembly of claim 1 wherein said one or more sectionals include raised detectable warnings for alerting persons of nearby hazards.

4. The removable safety flooring and anchor box assembly of claim 1 wherein said one or more sectionals include raised bars sized and positioned for directing the wheels of a wheelchair.

5. The removable safety flooring and anchor box assembly of claim 1 wherein said two part fasteners are threaded fasteners, and said matrix anchor includes a bolt and said ground anchor includes a nut.

6. The method of assembling a removable safety flooring and anchor box assembly comprising the steps of:
   providing a cement substrate in a softened conditioned, providing an anchor box, providing one or more flooring matrix sectionals; and providing a plurality of two-part fasteners each of two-part fasteners consisting of a matrix anchor engaging said flooring matrix sectional and a ground anchor engaging and affixed to said anchor box, said matrix anchors and ground anchors being selectively engageable and disengageable to one another for selectively securing said one or more sectionals to said anchor box and for selectively disengaging said one or more sectionals from said anchor box;
   embedding the anchor box into the cement substrate while the cement substrate is in a softened condition;
   allowing the cement substrate to harden; and
   affixing the flooring matrix sectionals to said anchor box using said two-part fasteners.

7. The method of assembling a removable safety flooring and anchor box assembly of claim 6 wherein said one or more sectionals include raised detectable warnings for alerting persons of nearby hazards.

8. The method of assembling a removable safety flooring and anchor box assembly of claim 6 wherein said one or more sectionals include beveled edges.

9. The method of assembling a removable safety flooring and anchor box assembly of claim 6 wherein said one or more sectionals include raised bars sized and positioned for directing the wheels of a wheelchair.

* * * * *